United States Patent
Tanaka et al.

(10) Patent No.: US 7,978,291 B2
(45) Date of Patent: Jul. 12, 2011

(54) LIQUID CRYSTAL DISPLAY DEVICE

(75) Inventors: Shinichiro Tanaka, Tottori (JP); Hironori Taniguchi, Tottori (JP); Koji Yoshida, Tottori (JP)

(73) Assignee: Sony Corporation, Tokyo (JP)

( * ) Notice: Subject to any disclaimer, the term of this patent is extended or adjusted under 35 U.S.C. 154(b) by 253 days.

(21) Appl. No.: 11/362,219

(22) Filed: Feb. 27, 2006

(65) Prior Publication Data

US 2006/0192909 A1    Aug. 31, 2006

(30) Foreign Application Priority Data

Feb. 28, 2005  (JP) ................................. 2005-052687
Jun. 10, 2005  (JP) ................................. 2005-170442

(51) Int. Cl.
 *G02F 1/1333*  (2006.01)
 *G02F 1/1339*  (2006.01)
(52) U.S. Cl. ................. 349/138; 349/106; 349/155
(58) Field of Classification Search .................. 349/138, 349/155, 106, 156
See application file for complete search history.

(56) References Cited

U.S. PATENT DOCUMENTS

| | | | |
|---|---|---|---|
| 6,072,557 A * | 6/2000 | Kishimoto | 349/156 |
| 7,321,409 B2 | 1/2008 | Murai et al. | |
| 2003/0231267 A1 * | 12/2003 | Murai et al. | 349/113 |
| 2004/0012738 A1 * | 1/2004 | Murai et al. | 349/114 |

FOREIGN PATENT DOCUMENTS

| | | |
|---|---|---|
| JP | 7-261183 | 10/1995 |
| JP | 2002-229048 | 8/2002 |
| JP | 2003-57433 | 2/2003 |
| JP | 2003-344838 A | 12/2003 |
| JP | 2004-287468 | 10/2004 |
| JP | 2004-325822 | 11/2004 |

OTHER PUBLICATIONS

Japanese Office Action for corresponding JP2005-170442 issued on Oct. 19, 2010.

* cited by examiner

*Primary Examiner* — Michael H Caley
(74) *Attorney, Agent, or Firm* — K&L Gates LLP

(57) ABSTRACT

In the liquid crystal display device of the present invention, channels 13 containing gaps 12 of the adjacent color filers CF are formed on the surface of a transparent thickness section 11, such that when orientation agent is applied by means of a roller to the surface of the transparent section wall 11, the surplus orientation agent is conducted to either side of the transparent thickness wall 11 through the channels 13, such that the orientation agent does not gather and is dissolved, and the orientation thickness film does not become uneven as to produce any orientation defect and defective display is thereby avoided.

8 Claims, 2 Drawing Sheets

LIQUID CRYSTAL DISPLAY DEVICE

BACKGROUND OF THE INVENTION

1. Field of the Invention

The present invention relates to the form of the transparent thickness section provided on the side of the color filter board of a liquid crystal display device.

2. Background Art

In one example of the semi-transmissive type of liquid crystal display devices of prior art, a picture element has a reflective part that utilizes environmental light to implement displays in the reflective mode and a transmissive part that utilizes a backlight to implement displays in the transmissive mode. FIG. 2 represents an extracted portion of a semi-transmissive type liquid crystal display device (cell) corresponding to a single picture element (picture electrode), and schematically presents a cross-sectional view of such portion.

As shown in FIG. 2, the bottom part of a picture electrode board 1 includes a transparent substrate 2 (typically a glass substrate), over which a picture electrode 4 is made to reside, and an interlayer film 3 is inserted there between, where necessary. On the left half side of the picture electrode 4, a reflecting plate 5 is provided at the boundary between the interlayer film 3 and the picture electrode 4, such left half portion constituting a reflective part 6. The right-half portion of the picture electrode 4, where the reflecting plate 5 is absent, represents the transmissive part 7.

As shown in FIG. 2, a color filter board 8 is deployed on the upper side opposite the picture electrode board 1. The distance between the two boards 1, 8 is determined by, for example, a rib 9, and the space between the two boards is filled with liquid crystal 10. On the surface of the color filter board 8 positioned opposite the picture electrode board 1, color filters CF are provided for three colors, namely, red (R), green (G) and blue (B).

However, whereas the light from the backlight (not shown in the drawing) passes only once through the liquid crystal layer in the transmissive part 7 of the conventional semi-transmissive type liquid crystal display device, the environmental light that enters through the glass filter board 8 in the reflective part 6 passes through the liquid crystal layer twice because it is reflected by the reflecting plate 5 of the picture electrode board 1. This means that the actual thickness of the liquid crystal layer as regards the transmitted light varies, and as a result it is necessary to implement gap control. To that end, a transparent thickness section 11 (a transparent layer) is provided over the color filter board 8, as disclosed in published literature pertaining to JP-A-2003-57433, where the transparent thickness section is referred to as a "transparent layer". Together with the color filters CF, the transparent thickness section 11 composes a pixel element and is therefore usually formed so as to straddle the gaps between adjacent color filters.

In an ordinary liquid crystal display device (not shown), a transparent thickness section is formed on the surface of the color filter layer for the purpose of enhancing the flatness of the color filter layer, as well as protecting such color filter layer in cases where an opposing electrode (such as indium oxide film) is formed over such color filter layer, as disclosed in published literature pertaining to JP-A-7-261183.

In the process of manufacturing liquid crystal display devices, including semi-transmissive ones, after the transparent thickness section 11 is formed, an opposing electrode (indium oxide film) and an orientation film, (both not shown in the drawings), are formed over its surface. The orientation film is formed by applying polyimide resin or similar orientation agent with a roller or similar implement, then drying it. Such process however causes puddling of the surplus orientation agent, making the orientation film uneven and run in the direction roughly parallel to the direction in which the locally-formed transparent thickness sections 11 are lined up (in the direction of the width of the transparent thickness section 11, i.e., the direction perpendicular to the cross-sectional plane of FIG. 2).

Such unevenness in thickness of the orientation film gives rise to twists and irregularities in the orientation of the liquid crystal molecules, inducing orientation defects in them, as would lead to defective display as well as deterioration of display quality.

SUMMARY OF THE INVENTION

The present invention therefore aims to eliminate such unevenness of thickness of the orientation film that occurs during application of the orientation agent which leads to such orientation defects in the liquid crystal molecules.

In order to achieve the aforementioned purpose, the liquid crystal display device of the present invention is equipped with a picture electrode board and a color filter board comprising, besides color filters, an orientation film for liquid crystal as its outermost layer on its inward side, and has a transparent thickness section formed locally on the picture element portion of the inward side of the color filter board, such transparent thickness section having channels formed in it along the gaps between adjacent color filters. "Gaps" here refer to gaps envisaged in the design, as in actuality, color filters in liquid crystal display devices sometimes protrude or adjacent color filters overlap and in such cases there may be boundaries rather than gaps between the filters, although such boundaries can be safely regarded as gaps. In such cases, likewise, black matrixes can be formed between the color filters, and the adjacent color filters will approach each other over such black matrixes, in order that channels formed at the boundaries between the color filters will not be visible and will unlikely affect the quality of display. Further, as the picture electrode board is provided with a reflective part and a transmissive part in each picture element, the position of the transparent thickness section of the color filter board may be made to correspond with the position of the reflective parts of the picture electrode board, with the channels of the transparent thickness section being provided in the gaps in the picture elements of the picture electrode board. More preferably, the channels of the transparent thickness section will be positioned along the color filters adjacent to each other. Or, where black matrixes are formed between the color filters of the color filter board, the width of the channels of the transparent thickness section will be smaller than the width dimension of such black matrixes provided between color filters adjacent to each other.

The liquid crystal display device of the present invention may be provided with ribs that are located between the picture electrode board and the color filter board and restrict the thickness of the liquid crystal layer, in which case the channels of the transparent thickness section will be positioned in places other than those where such ribs are provided, or more preferably, the channels of the transparent thickness section will be positioned so as to cross, at an angle other than orthogonal, the direction in which the orientation film (agent) is applied, or alternatively, the channels of the transparent thickness section will be positioned as to be roughly aligned in the direction in which the orientation film (agent) is applied.

The picture electrode board in the liquid crystal display device of the present invention may be an array board that is provided with a reflective part and a transmissive part in each picture element, each of whose picture electrodes is provided with an active element, in which case the position of the transparent thickness section of the color filter board will be such as to correspond with the position of the reflective parts of the picture electrode board, while the channels of the transparent thickness section will be provided in the gaps between the picture elements of the picture electrode board, and the active elements and channels will be covered by a light-shielding means.

Owing to the afore-described structure, the orientation agent will spread along the channels in the transparent thickness section, so that the probability of the thickness of the orientation film becoming uneven due to puddling of the orientation agent will be extremely reduced. As a result, no orientation defects will be likely induced in the liquid crystal molecules which lead to defective display.

If the width of the channels is made smaller than the width dimension of the black matrixes provided between adjacent color filters, the channels will be concealed by the black matrixes and hence display quality of the completed display device will not suffer.

DESCRIPTION OF THE PREFERRED EMBODIMENT

Figure 1:
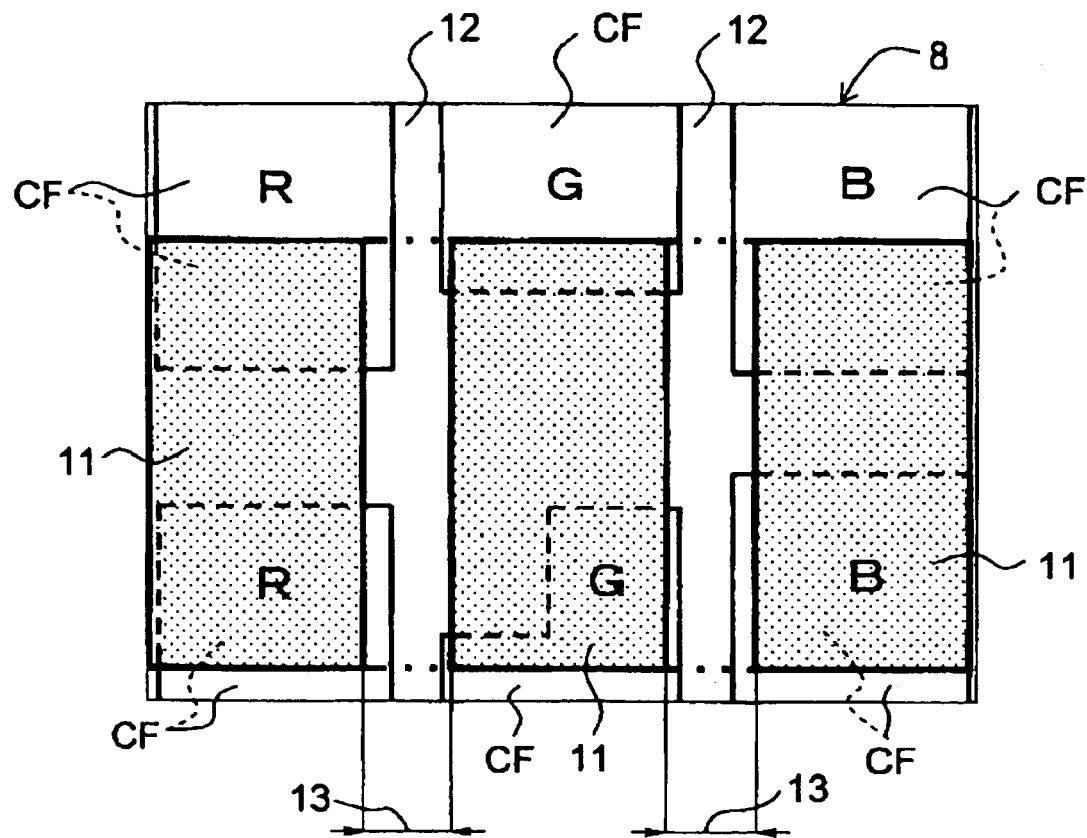
FIG. 1 is a partial plane view of the color filter board with a transparent thickness section in which channels are formed featuring an embodiment of the present invention.

The embodiments of the present invention will be described hereafter with reference to the drawings. These embodiments are implemented in a semi-transmissive type of liquid crystal display device similar to the conventional device described earlier, such that elements similar to those of the conventional device have been assigned identical reference numerals and description thereof is omitted. Moreover, description of the manufacturing process of the various component elements of the liquid crystal display device which are also elements of the present invention, such as those pertaining to the transparent thickness section, is omitted here since the relevant manufacturing techniques are already part of the public domain.

FIG. 1 is a partial plane view of the color filter board 8 with a transparent thickness section in which the channels formed constitute a structural element of the present invention.

As shown in FIG. 1, color filters CF for three colors, namely, red (R), green (G) and blue (B), are formed from left to right with a certain gap 12 between them.

A transparent thickness section 11 of a certain width is formed to lie parallel to the row of color filters CF of the three colors, whereby the direction of the color filter CF row is the longitudinal direction of the transparent thickness section 11. Further, channels 13 of a certain width are formed widthwise across the transparent thickness section 11. Such channels 13 are positioned so as to lie along the gaps 12 between the adjacent color filter CF, and are shaped in such manner as to embrace the gaps 12. The double-dot lines FIG. 1 represent the ensuing outline of the transparent thickness section if the channels 13 were not formed.

The transparent thickness section 11 is formed by means of a resist, using a well-known photolithography method, and the channels 13 are formed simultaneously during such process.

Figure 2:
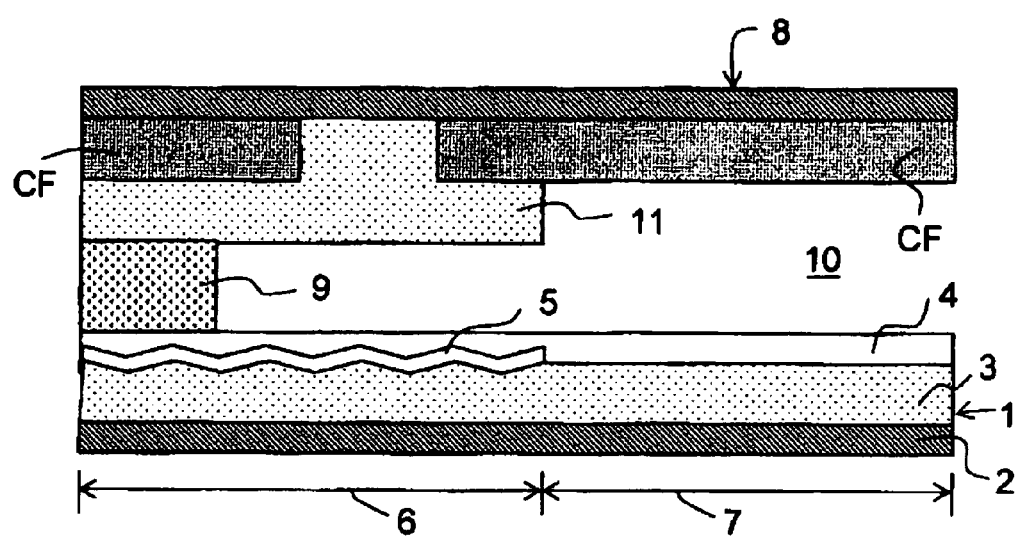
FIG. 2 is a partial cross-sectional view of the common structure of semi-transmissive type of liquid crystal display devices with a color filter board in which a transparent thickness section is formed.

To complete the semi-transmissive type liquid crystal display device of the present embodiment, a picture electrode board 1 for a semi-transmissive type liquid crystal display device of ordinary construction such as shown in FIG. 2 is formed opposite the color filter board 8 with the above-described structure, and the space between the two boards is filled with liquid crystal 10.

Because provision has been made for the channels 13 in the transparent thickness section 11, the excess orientation agent that is applied to the surface of the transparent thickness section 11 is diverted to either side thereof, as a result of which, puddling of the orientation agent is eliminated, and the occurrence of unevenness in thickness of the orientation film is avoided.

Because the occurrence of such unevenness is blocked, no twists, irregularities or other "orientation defects" in the orientation of the liquid crystal molecules are induced in the completed semi-transmissive type liquid crystal display device of the present embodiment. Hence, the likelihood of defective display occurring due to such defects is eliminated.

In another embodiment relating to the formation of the channels 13, black matrixes (light-shielding films) not shown in the drawing are formed between the color filters CF in the gap locations where the channels 13 are formed, whereby the width of the channels 13 is made smaller than that of the black matrixes, so that the channels 13 are enveloped by the black matrixes. In this way, deterioration in display quality of the liquid crystal display device of the said embodiment will not occur because the channels 13 will in effect be concealed by the black matrixes.

Thus, the present invention pertains to a liquid crystal display device equipped with a picture electrode board and a color filter board comprising, besides color filters, an orientation film for liquid crystal as its outermost layer on its inward side, and has a transparent thickness section formed locally in the picture element portion on the inner side of the color filter board, with the innovative feature that channels are formed in such transparent thickness section so as to lie along the gaps between adjacent color filters and divide the pixel elements (for instance R, G, B).

The publicly known semi-transmissive type of liquid crystal display devices has a picture electrode board that is provided with a reflective part and a transmissive part in each picture element. In contrast, in another embodiment of the present invention, the position of the transparent thickness section of the color filter board of the present invention corresponds with the position of the reflective parts of the picture electrode board, and the channels of the transparent thickness section are provided in the gaps in the picture elements of the picture electrode board. Within each pixel element two adjacent color filters lie, and hence two locations are provided for channels in the transparent thickness section. Yet in another embodiment, such channel is provided in one such location only, that is, merely along one of the color filters.

Likewise in another embodiment of the present invention, black matrixes are formed between the color filters on the color filter board, and the width of the channels of the transparent thickness section is smaller than the width dimension of the black matrixes provided between the adjacent color filters.

In a further embodiment, the liquid crystal display device of the present invention is additionally provided with ribs located between the picture electrode board and the color filter board, that serve to restrict the thickness of the liquid crystal layer, and the channels of the transparent thickness section are positioned in places other than those where such ribs are provided.

Further, in another embodiment of the present invention, the channels of the transparent thickness section are positioned so as to cross, at an angle other than orthogonal, the direction in which the orientation film is applied, or alternatively, the channels of the transparent thickness section are positioned in rough alignment with the direction in which the orientation film is applied.

Further, still, in another embodiment of the present invention, the picture electrode board is an array board provided with a reflective part and a transmissive part in each picture element and has picture electrodes provided with active elements, and the device is further characterized in that the position of the transparent thickness section of the color filter board corresponds to the position of the reflective parts of the picture electrode board, while the channels of the transparent thickness section are provided in the gaps in the picture elements of the picture electrode board and the active elements and channels are covered by a light-shielding means.

Although the foregoing embodiments have used the example of a semi-transmissive type liquid crystal display device to describe the present invention, the application of the distinctive structural feature of the invention which is the provision for channels in the transparent thickness section as escape paths for the surplus orientation agent is by no means limited to liquid crystal display devices of the semi-transmissive type. Such structural feature is likewise generally applicable to liquid crystal display devices of the transmissive and reflective types that are provided with a transparent thickness layer section over the top layers of their color filter layers.

What is claimed is:

1. A liquid crystal display device, comprising:
   a picture electrode board;
   a color filter board having (i) an orientation film for liquid crystal as its outermost layer on its inward side and (ii) color filters, wherein gaps are between adjacent color filters;
   a transparent thickness section that is formed locally on a picture element portion of the inward side of the color filter board, wherein channels are formed across the transparent thickness section and along the gaps between adjacent color filters; and
   a plurality of ribs between the picture electrode board and the color filter board, wherein the ribs determine a distance between the picture electrode board and the color filter board, and the channels of the transparent thickness section are positioned in places other than those where the ribs are provided, wherein black matrixes are formed between the color filters of the color filter board, and wherein black matrixes are formed between the color filters on the color filter board, and the width of the channels formed on the transparent thickness section is smaller than that of the black matrixes provided between the adjacent color filters.

2. The liquid crystal display device according to claim 1, wherein adjacent filters approach each other over the black matrixes.

3. The liquid crystal display device according to claim 1, wherein the width of the channels are wider than the gaps between the color filters.

4. A liquid crystal display device, comprising:
   a picture electrode board;
   a color filter board having (i) an orientation film for liquid crystal as its outermost layer on its inward side and (ii) color filters, wherein gaps are between adjacent color filters;
   a transparent thickness section that is formed locally on a picture element portion of the inward side of the color filter board, wherein channels are formed across the transparent thickness section and along the gaps between adjacent color filters; and
   a plurality of ribs between the picture electrode board and the color filter board, wherein the ribs determine a distance between the picture electrode board and the color filter board, and the channels of the transparent thickness section are positioned in places other than those where the ribs are provided, wherein the picture electrode board is provided with a reflective part and a transmissive part in each picture element, the position of the transparent thickness section of the color filter board being such as to correspond with that of the reflective part of the picture electrode board, and the transparent thickness section is provided with channels formed in the gaps between the picture elements of the picture electrode board.

5. The liquid crystal display device according to claim 1, wherein the channels formed on the transparent thickness section are positioned alternately along the adjacent color filters.

6. The liquid crystal display device according to claim 1, wherein the channels of the transparent thickness section are positioned so as to cross, at an angle other than orthogonal, the direction in which the orientation film is applied.

7. The liquid crystal display device according to claim 1, wherein the channels of the transparent thickness section are positioned in rough alignment with the direction in which the orientation film is applied.

8. A liquid crystal display device, comprising:
   a picture electrode board;
   a color filter board having (i) an orientation film for liquid crystal as its outermost layer on its inward side and (ii) color filters, wherein gaps are between adjacent color filters;
   a transparent thickness section that is formed locally on a picture element portion of the inward side of the color filter board, wherein channels are formed across the transparent thickness section and along the gaps between adjacent color filters; and
   a plurality of ribs between the picture electrode board and the color filter board, wherein the ribs determine a distance between the picture electrode board and the color filter board, and the channels of the transparent thickness section are positioned in places other than those where the ribs are provided, wherein the picture electrode board is an array board provided with a reflective part and a transmissive part in each picture element and has picture electrodes provided with active elements, further characterized in that the position of the transparent thickness section of the color filter board corresponds to the position of the reflective parts of the picture electric board, the channels of the transparent thickness section being provided in the gaps between the picture elements of the picture electric board, and the active elements and channels are covered over by a light-shielding means.

* * * * *